United States Patent
Imanishi et al.

(10) Patent No.: US 10,079,397 B2
(45) Date of Patent: Sep. 18, 2018

(54) METHOD OF DETECTING LEAKAGE OF REACTIVE GAS OF FUEL CELL AND FUEL CELL SYSTEM

(71) Applicant: TOYOTA JIDOSHA KABUSHIKI KAISHA, Toyota-shi, Aichi-ken (JP)

(72) Inventors: Hiroyuki Imanishi, Toyota (JP); Masashi Toida, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 355 days.

(21) Appl. No.: 14/920,048

(22) Filed: Oct. 22, 2015

(65) Prior Publication Data
US 2016/0141677 A1  May 19, 2016

(30) Foreign Application Priority Data
Nov. 13, 2014 (JP) .................. 2014-230861

(51) Int. Cl.
| | | |
|---|---|---|
| *H01M 8/0438* | (2016.01) | |
| *H01M 8/04664* | (2016.01) | |
| *H01M 8/04225* | (2016.01) | |
| *H01M 8/1018* | (2016.01) | |

(52) U.S. Cl.
CPC ... *H01M 8/04388* (2013.01); *H01M 8/04225* (2016.02); *H01M 8/04664* (2013.01); *H01M 2008/1095* (2013.01)

(58) Field of Classification Search
CPC ......... H01M 8/04388; H01M 8/04664; H01M 8/04225; H01M 2008/1095
See application file for complete search history.

(56) References Cited

U.S. PATENT DOCUMENTS

| | | |
|---|---|---|
| 7,442,452 B2 | 10/2008 | Miura |
| 2001/0001287 A1 | 5/2001 | Ueno et al. |
| 2006/0166060 A1 | 7/2006 | Miura |

FOREIGN PATENT DOCUMENTS

| | | |
|---|---|---|
| CN | 1871735 A | 11/2006 |
| JP | 2004-192919 A | 7/2004 |
| JP | 2010-272433 | 12/2010 |
| JP | 2012-133997 A | 7/2012 |
| JP | 2012-151125 | 8/2012 |

*Primary Examiner* — Jane Rhee
(74) *Attorney, Agent, or Firm* — Finnegan, Henderson, Farabow, Garrett & Dunner, LLP (57) ABSTRACT

To provide a technique that allows prompt detection of leakage of fuel gas in a fuel cell system. A controller included in a fuel cell system performs a hydrogen leakage detecting process of detecting the occurrence of hydrogen leakage in the low-pressure zone based on the detected pressure in a low-pressure zone of an anode gas piping at a time of start-up of the fuel cell system. A controller uses at least one of a first condition and a second condition for determination as a determination condition in hydrogen leakage detecting process, and determines that there is no leakage of the reactive gas while the fuel cell stops generating power if the determination condition is satisfied.

6 Claims, 5 Drawing Sheets

“METHOD OF DETECTING LEAKAGE OF REACTIVE GAS OF FUEL CELL AND FUEL CELL SYSTEM”

CROSS-REFERENCE TO RELATED APPLICATIONS

This application claims priority based on Japanese Patent Application No. (JP) 2014-230861 filed on Nov. 13, 2014, the disclosure of which is incorporated herein by reference in its entirety.

BACKGROUND

Field

This invention relates to a method of detecting leakage of reactive gas of a fuel cell and a fuel cell system.

Related Art

A polymer electrolyte fuel cell, hereinafter also called a "fuel cell" simply, generates power in response to receipt of hydrogen supplied as fuel gas and oxygen (air) as oxidizing gas. Various techniques relating to detection of hydrogen leakage have been suggested for a fuel cell system as described in JP2010-272433A and JP2012-151125A, for example.

As disclosed in such as the aforementioned publications, it is desirable that hydrogen leakage be detected reliably before a fuel cell starts generating power at a time of start-up of a fuel cell system. Additionally, it is desirable that a time to elapse before operation of the fuel cell is started be shortened at a time of start-up of the fuel cell system.

SUMMARY

In order to solve at least part of the problems described above of a fuel cell, the present invention may be implemented by the following aspects. This invention may be implemented in the following exemplary aspects. An aspect of this invention may be a method of detecting leakage of reactive gas to be supplied to a fuel cell at a time of start-up of the fuel cell, comprising: a pressure detecting step of detecting pressure in a supply piping before the reactive gas is supplied to the fuel cell through the supply piping; and a determining step of determining the presence or absence of leakage of the reactive gas using a measured pressure value obtained in the pressure detecting step, wherein the determining step uses at least one of a first condition and a second condition for determination as a determination condition, and determines that there is no leakage of the reactive gas while the fuel cell stops generating power if the determination condition is satisfied, the first condition is that the measured pressure value is equal to or higher than a first pressure value that is lower than pressure in the supply piping at a time of end of operation of the fuel cell and higher than atmospheric pressure, the second condition is that the measured pressure value is equal to or lower than a second pressure value that is lower than the atmospheric pressure.

(1) A first aspect of this invention provides a method of detecting leakage of reactive gas to be supplied to a fuel cell at a time of start-up of the fuel cell. This method may include a pressure detecting step and a determining step. The pressure detecting step may be a step of detecting pressure in a supply piping before the reactive gas is supplied to the fuel cell through the supply piping. The determining step may be a step of determining the presence or absence of leakage of the reactive gas using a measured pressure value obtained in the pressure detecting step. The determining step may be a step of determining that there is no leakage of the reactive gas while the fuel cell stops generating power if the measured pressure value is equal to or higher than a predetermined threshold pressure. The predetermined threshold pressure may be lower than pressure in the supply piping at a time of end of operation of the fuel cell and higher than atmospheric pressure. The method of this aspect makes it possible to determine the presence or absence of leakage of the reactive gas without requiring a process such as pressurizing the supply piping by supplying the reactive gas to the supply piping to be performed in preparation for detection of leakage of the reactive gas. Thus, leakage of the reactive gas is possible to detect promptly before the fuel cell starts generating power.

(2) The aforementioned method of the first aspect may further include a pressurizing leakage detecting step of supplying the reactive gas in order to pressurize the supply piping and detecting leakage of the reactive gas based on pressure change in the supply piping after the supply piping is pressurized. The pressurizing leakage detecting step may be performed if the measured pressure value is determined to be lower than the threshold pressure in the determining step. The method of this aspect makes it possible to detect leakage of the reactive gas more reliably before the fuel cell starts generating power.

(3) A second aspect of this invention provides a method of detecting leakage of reactive gas to be supplied to a fuel cell at a time of start-up of the fuel cell. This method may include a pressure detecting step and a determining step. The pressure detecting step may be a step of detecting pressure in a supply piping before the reactive gas is supplied to the fuel cell through the supply piping. The determining step may be a step of determining the presence or absence of leakage of the reactive gas using a measured pressure value obtained in the pressure detecting step. The determining step may be a step of determining that there is no leakage of the reactive gas while the fuel cell stops generating power if the measured pressure value is equal to or lower than a predetermined threshold pressure. The predetermined threshold pressure may be lower than atmospheric pressure. The method of this aspect makes it possible to determine the presence or absence of leakage of the reactive gas without requiring a process such as pressurizing the supply piping by supplying the reactive gas to the supply piping to be performed in preparation for detection of leakage of the reactive gas. Thus, leakage of the reactive gas is possible to detect promptly before the fuel cell starts generating power.

(4) The aforementioned method of the second aspect may further include a pressurizing leakage detecting step of supplying the reactive gas in order to pressurize the supply piping and detecting leakage of the reactive gas based on pressure change in the supply piping after the supply piping is pressurized. The pressurizing leakage detecting step may be performed if the measured pressure value is determined to be higher than the threshold pressure in the determining step. The method of this aspect makes it possible to detect leakage of the reactive gas more reliably before the fuel cell starts generating power.

(5) A third aspect of this invention provides a method of detecting leakage of reactive gas to be supplied to a fuel cell at a time of start-up of the fuel cell. This method may include a pressure detecting step and a determining step. The pressure detecting step may be a step of detecting pressure in a supply piping before the reactive gas is supplied to the fuel cell through the supply piping. The determining step may be a step of determining the presence or absence of leakage of the reactive gas using a measured pressure value obtained in the pressure detecting step. The determining step may be a step of determining that there is no leakage of the reactive gas while the fuel cell stops generating power if the measured pressure value is out of a predetermined threshold pressure range. An upper limit of the predetermined threshold pressure range may be lower than pressure in the supply piping at a time of end of operation of the fuel cell and higher than atmospheric pressure. A lower limit of the predetermined threshold pressure range may be lower than the atmospheric pressure. The method of this aspect makes it possible to determine the presence or absence of leakage of the reactive gas without executing a preparing process for detecting leakage of the reactive gas, such as pressurizing the supply piping by supplying the reactive gas to the supply piping. Thus, leakage of the reactive gas is detected promptly before the fuel cell starts generating power.

(6) The aforementioned method of the third aspect may further include a pressurizing leakage detecting step of supplying the reactive gas to the supply piping in order to pressurize the supply piping and detecting leakage of the reactive gas based on pressure change in the supply piping after the supply piping is pressurized. The pressurizing leakage detecting step may be performed if the measured pressure value is determined to be within the given threshold pressure range in the determining step. The method of this aspect makes it possible to detect leakage of the reactive gas more reliably before the fuel cell starts generating power.

(7) A fourth aspect of this invention provides a fuel cell system. This fuel cell system may include a fuel cell, a reactive gas supply unit, a pressure detector, and a controller. The reactive gas supply unit may include a supply piping connected to the fuel cell and supply reactive gas to the fuel cell through the supply piping. The pressure detector may detect pressure in the supply piping. The controller may control operation of the fuel cell by controlling supply of the reactive gas to the fuel cell. The controller may obtain a detected value of pressure in the supply piping based on the detected result by the pressure detector before supplying the reactive gas to the fuel cell to make the fuel cell start generating power. The controller may start a process of making the fuel cell start generating power if the detected value is equal to or higher than given threshold pressure. The controller may start a process of detecting leakage of the reactive gas if the detected value is lower than the threshold pressure. The threshold pressure may be lower than pressure in the supply piping at a time of end of operation of the fuel cell and higher than atmospheric pressure. The fuel cell system of this aspect makes it possible to omit a process such as pressurizing the supply piping by supplying the reactive gas to the supply piping to be performed in preparation for detection of leakage of the reactive gas. Thus, a start-up time to elapse before the fuel cell starts generating power can be shortened.

(8) A fifth aspect of this invention provides a fuel cell system. This fuel cell system may include a fuel cell, a reactive gas supply unit, a pressure detector, and a controller. The reactive gas supply unit may include a supply piping connected to the fuel cell and supply reactive gas to the fuel cell through the supply piping. The pressure detector may detect pressure in the supply piping. The controller may control operation of the fuel cell by controlling supply of the reactive gas to the fuel cell. The controller may obtain a detected value of pressure in the supply piping based on the detected result by the pressure detector before supplying the reactive gas to the fuel cell to make the fuel cell start generating power. The controller may start a process of making the fuel cell start generating power if the detected value is equal to or lower than a predetermined threshold pressure. The controller may start a process of detecting leakage of the reactive gas if the detected value is higher than the threshold pressure. The predetermined threshold pressure may be lower than atmospheric pressure. The fuel cell system of this aspect makes it possible to omit a process such as pressurizing the supply piping by supplying the reactive gas to the supply piping to be performed in preparation for detection of leakage of the reactive gas. Thus, a start-up time to elapse before the fuel cell starts generating power can be shortened.

(9) A sixth aspect of this invention provides a fuel cell system. This fuel cell system may include a fuel cell, a reactive gas supply unit a pressure detector, and a controller. The reactive gas supply unit may include a supply piping connected to the fuel cell and supply reactive gas to the fuel cell through the supply piping. The pressure detector may detect pressure in the supply piping. The controller may control operation of the fuel cell by controlling supply of the reactive gas to the fuel cell. The controller may obtain a detected value of pressure in the supply piping based on the detected result by the pressure detector before supplying the reactive gas to the fuel cell to make the fuel cell start generating power. The controller may start a process of making the fuel cell start generating power if the detected value is out of a predetermined threshold pressure range. The controller may start a process of detecting leakage of the reactive gas if the detected value is within the predetermined threshold pressure range. An upper limit of the predetermined threshold pressure range may be lower than pressure in the supply piping at a time of end of operation of the fuel cell and higher than atmospheric pressure. A lower limit of the predetermined threshold pressure range may be lower than the atmospheric pressure. The fuel cell system of this aspect makes it possible to omit a process such as pressurizing the supply piping by supplying the reactive gas to the supply piping to be performed in preparation for detection of leakage of the reactive gas. Thus, a start-up time to elapse before the fuel cell starts generating power can be shortened.

Not all the constituent elements of each of the aforementioned aspects of this invention are not absolute necessities. Where appropriate, some of these constituent elements can be changed, deleted, replaced by a different new constituent element, or deleted partially in terms of its limitation with the intention of solving some or all of the aforementioned problems or achieving some or all of effects described in this specification. Further, with the intention of solving some or all of the aforementioned problems or achieving some or all of the effects described in this specification, some or all of the technical features in one of the aforementioned aspects of this invention may be combined with some or all of the technical features in a different one of the aforementioned aspects of this invention to form an independent aspect of this invention.

This invention may be implemented in various aspects other than the method of detecting leakage of reactive gas of a fuel cell and the fuel cell system. For example, this invention may be implemented in aspects including a mobile object such as a fuel cell vehicle on which the fuel cell system is installed, a method of starting and a method of controlling the fuel cell system, a computer program to implement these methods, and a non-transitory recording medium storing this computer program.

DESCRIPTION OF THE EMBODIMENTS

A. First Embodiment

A1. Structure of Fuel Cell System

Figure 1:
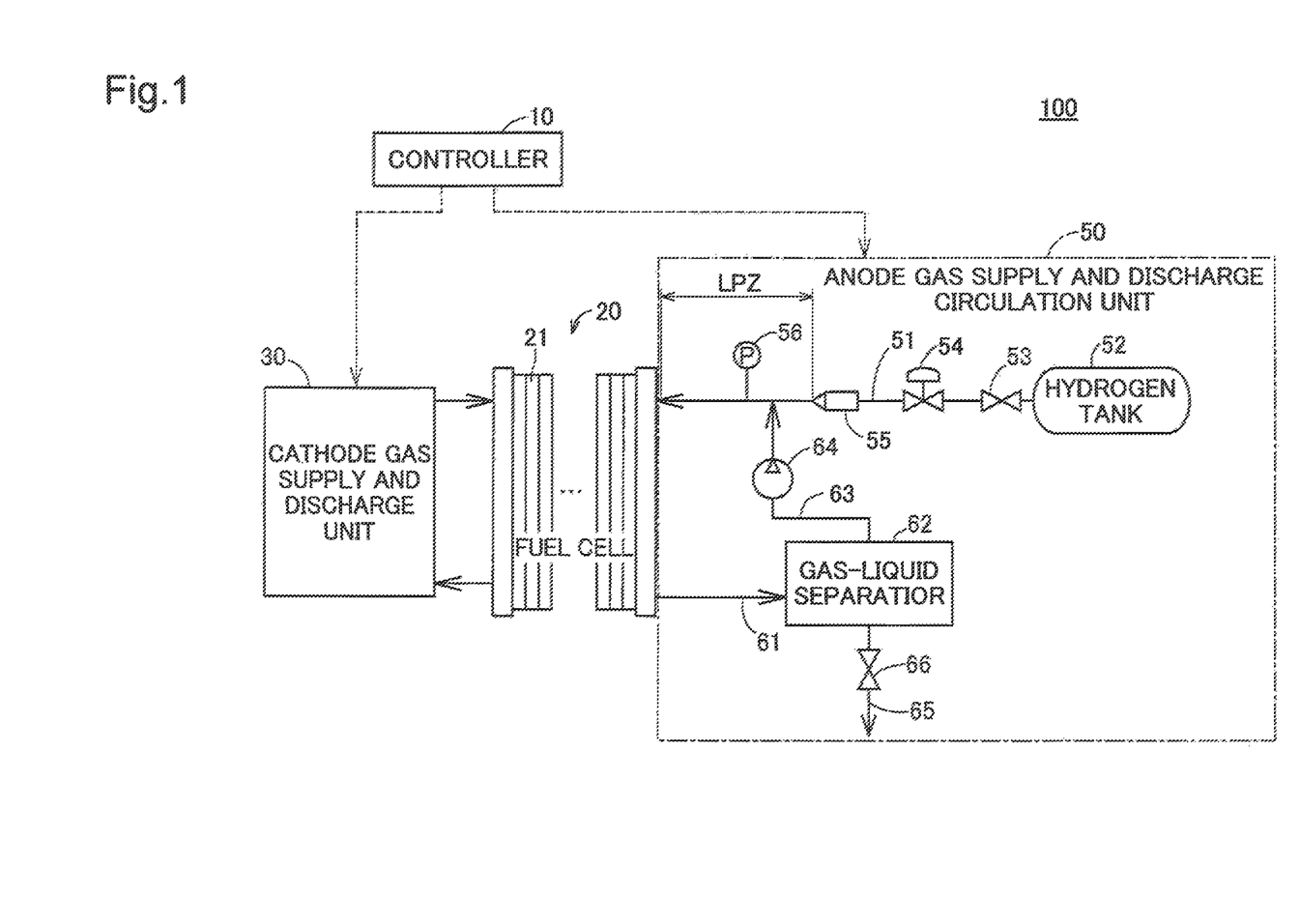
FIG. 1 is an outline view showing the structure of a fuel cell system.

FIG. 1 is an outline view showing the structure of a fuel cell system 100 in a first embodiment of this invention. The fuel cell system 100 is installed on a fuel cell vehicle and outputs power to be used as driving power in response to a request given from a driver. The fuel cell system 100 includes a controller 10, a fuel cell 20, a cathode gas supply and discharge unit 30, and an anode gas supply and discharge circulation unit 50.

The controller 10 is formed of a microcomputer including a central processing unit and a main storage. The controller 10 reads a program into the main storage and executes the read program, thereby realizing various functions. The controller 10 controls each of components described below during operation of the fuel cell system 100 and executes control operation of the fuel cell 20 that generates power according to the output request. The controller 10 performs a hydrogen leakage detecting process of detecting hydrogen leakage in the fuel cell system 100 before the operation for generating power in the fuel cell 20. The hydrogen leakage detecting process is described later.

The fuel cell 20 is a polymer electrolyte fuel cell that generates power in response to receipt of hydrogen (anode gas) and air (cathode gas) supplied as reactive gas. The fuel cell 20 has a stacked structure including a stack of multiple unit cells 21. Each unit cell 21 is a power generating element that is capable of generating power alone. Each unit cell 21 has a membrane electrode assembly as a power generator including electrodes arranged on opposite sides of an electrolyte membrane and two separators (not shown in the drawings) holding the membrane electrode assembly between the separators. The electrolyte membrane is formed of a solid polymer thin film that exhibits favorable proton conductivity when it is in a wet state containing water inside the film.

The cathode gas supply and discharge unit 30 has the function of supplying the cathode gas to the fuel cell 20 and the function of discharging the cathode gas and the drainage from the cathode of the fuel cell 20 to the outside of the fuel cell system 100. The cathode gas supply and discharge unit 30 supplies the cathode gas generated by taking in external air and compressing the external air with an air compressor (not shown in the drawings) to the fuel cell 20 through a piping connected to an inlet of the fuel cell 20 on a cathode-side. The cathode gas supply and discharge unit 30 discharges the cathode exhaust gas and the drainage to the outside of the fuel cell system 100 through a piping connected to an outlet of the fuel cell 20 on the cathode-side.

The anode gas supply and discharge circulation unit 50 has the function of supplying the anode gas to the fuel cell 20. The anode gas supply and discharge circulation unit 50 further has the function of discharging the anode gas and the drainage from the anode of the fuel cell 20 to the outside of the fuel cell system 100 and the function of circulating the anode exhaust gas in the fuel cell system 100. The anode gas supply and discharge circulation unit 50 corresponds to a concept subordinate to a reactive gas supply unit of this invention.

The anode gas supply and discharge circulation unit 50 includes an anode gas piping 51, a hydrogen tank 52, a main stop valve 53, a regulator 54, a hydrogen supply device 55, and a pressure measurement unit 56 in the upstream-side of the fuel cell 20. The hydrogen tank 52 is filled with high-pressure hydrogen to be supplied to the fuel cell 20. The hydrogen tank 52 is connected to an inlet of the fuel cell 20 on an anode side through the anode gas piping 51.

The main stop valve 53, the regulator 54, the hydrogen supply device 55, and the pressure measurement unit 56 are provided on the anode gas piping 51 in this order as viewed from the hydrogen tank 52 on an upstream-side. The main stop valve 53 is formed of an on-off valve. The controller 10 controls opening and closing of the main stop valve 53, thereby controlling flow of hydrogen from the hydrogen tank 52 toward an upstream side relative to the hydrogen supply device 55. The controller 10 closes the main stop valve 53 when stopping operation of the fuel cell system 100 and opens the main stop valve 53 when making the fuel cell 20 start generating power. The regulator 54 is a pressure reducing valve to adjust the pressure of hydrogen on the upstream side relative to the hydrogen supply device 55. A degree of opening of the regulator 54 is controlled by the controller 10. The hydrogen supply device 55 is formed of an injector as an electromagnetically driven on-off valve, for example.

Hydrogen in the anode gas piping 51 is in high pressure, for example about 500 kPa, in a zone between the main stop valve 53 and the regulator 54 and in medium pressure, for example about 350 kPa, in a zone between the regulator 54 and the hydrogen supply device 55. Further, this hydrogen is in low pressure, for example about 200 kPa, in a zone between the hydrogen supply device 55 and the fuel cell 20. In the below, the zone in the anode gas piping 51 between the hydrogen supply device 55 and the fuel cell 20 is also particularly called a "low-pressure zone LPZ." The anode gas piping 51 in the low-pressure zone LPZ corresponds to a concept subordinate to a supply piping of this invention.

The pressure measurement unit 56 measures the pressure of hydrogen in the low-pressure zone LPZ existing downstream relative to the hydrogen supply device 55 and transmits the measured pressure to the controller 10. When the fuel cell 20 is in operation, the controller 10 controls a driving cycle indicating timing of opening and closing the hydrogen supply device 55 based on the value measured by the pressure measurement unit 56, thereby controlling the amount of hydrogen to be supplied to the fuel cell 20. As described later, the controller 10 uses the value measured by the pressure measurement unit 56 in the hydrogen leakage detecting process performed before the fuel cell 20 starts operation. The pressure measurement unit 56 corresponds to a concept subordinate to a pressure detector of this invention.

The anode gas supply and discharge circulation unit 50 includes an anode discharged gas piping 61, a gas-liquid separator 62, an anode gas circulation piping 63, a hydrogen pump 64, an anode drain piping 65, and a drain valve 66 existing downstream relative to the fuel cell 20. The anode discharged gas piping 61 is connected to an outlet of the fuel cell 20 on the anode side and the gas-liquid separator 62.

The gas-liquid separator 62 is connected to the anode gas circulation piping 63 and the anode drain piping 65. Anode exhaust gas flown into the gas-liquid separator 62 through the anode discharged gas piping 61 is separated into a gas component and a water component by the gas-liquid separator 62. In the gas-liquid separator 62, the gas component of the anode exhaust gas is guided to the anode gas circulation piping 63 and the water component thereof is guided to the anode drain piping 65.

The anode gas circulation piping 63 is connected to the low-pressure zone LPZ of the anode gas piping 51. The anode gas circulation piping 63 is provided with the hydrogen pump 64. The hydrogen pump 64 functions as a circulation pump to feed hydrogen contained in the gas component resulting from the separation in the gas-liquid separator 62 to the anode gas piping 51. In this way, the anode gas supply and discharge circulation unit 50 is provided with a circulation path for hydrogen formed of the low-pressure zone LPZ of the anode gas piping 51, the anode of the fuel cell 20, the anode discharged gas piping 61, and the anode gas circulation piping 63.

The anode drain piping 65 is provided with the drain valve 66 as an on-off valve. The drain valve 66 is opened and closed according to an order from the controller 10. Generally, the controller 10 closes the drain valve 66. The controller 10 opens the drain valve 66 at the predetermined timing of discharging the drainage or discharging inert gas in anode exhaust gas. The controller 10 places the drain valve 66 in a closed position when the fuel cell system 100 is to stop operation.

The fuel cell system 100 additionally includes a refrigerant supply unit, which is not shown in the drawings and not described in detail. The refrigerant supply unit supplies a refrigerant to each unit cell 21 of the fuel cell 20 in order to control the temperature of the fuel cell 20. The fuel cell system 100 further includes, as electric components, at least a secondary cell and a DC/DC converter which are not shown in the drawings. The secondary cell stores power output from the fuel cell 20 and regenerative power. In this way, the secondary cell functions as a power source together with the fuel cell 20. The DC/DC converter can control charge and discharge of the secondary cell and can control an output voltage of the fuel cell 20. Before the fuel cell 20 starts operation, the controller 10 uses the power of the secondary power to put the fuel cell system 100 into operation.

A2. Hydrogen Leakage Detecting Process

Figure 2:
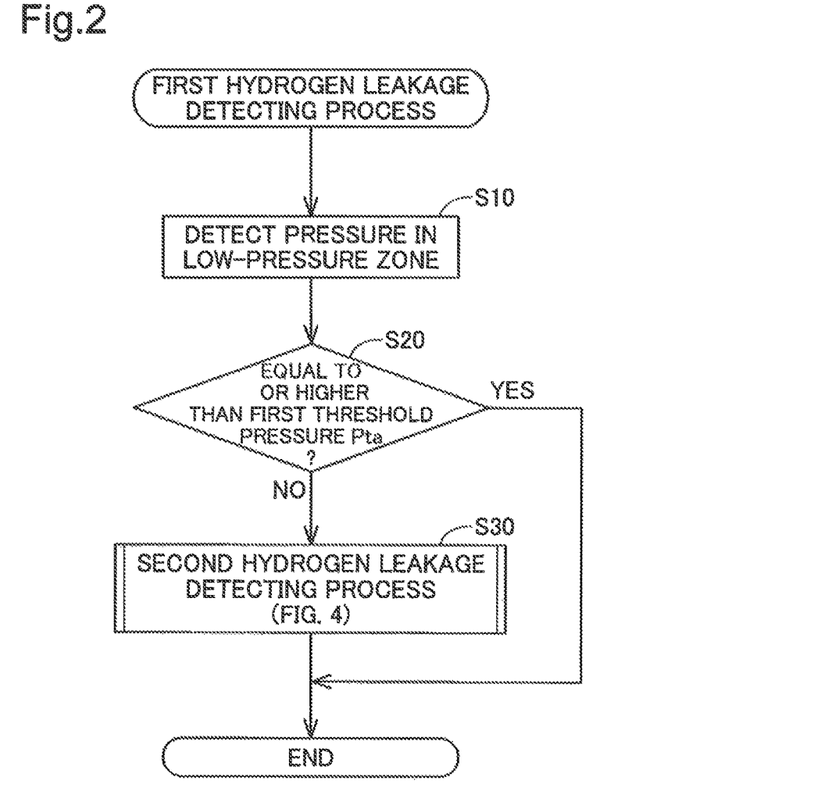
FIG. 2 is an explanatory view showing a flow of a first hydrogen leakage detecting process in a first embodiment.
Figure 3:
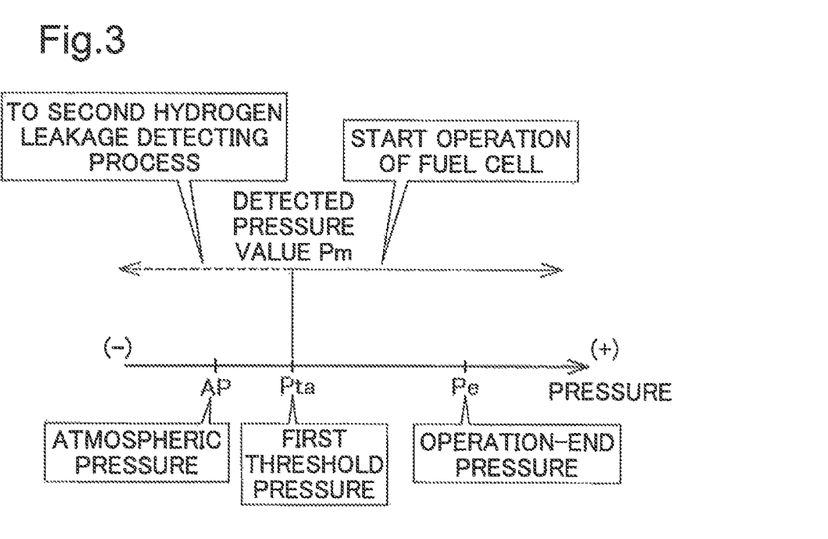
FIG. 3 is an explanatory view for explaining a determining process in the first hydrogen leakage detecting process in the first embodiment.
Figure 4:
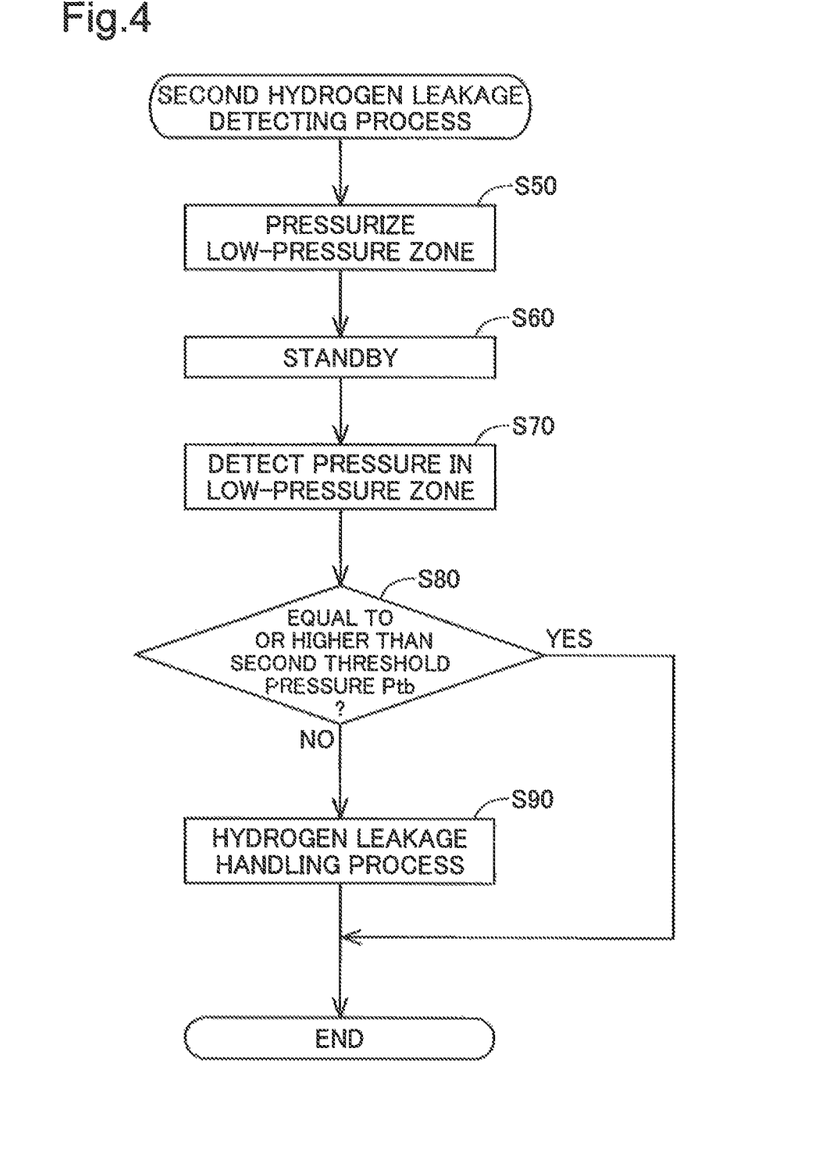
FIG. 4 is an explanatory view showing a flow of a second hydrogen leakage detecting process.

With referring to FIGS. 2 to 4, describe the hydrogen leakage detecting process that is performed by the controller 10 at a time of start-up of the fuel cell system 100. The fuel cell system 100 is started up in response to operation of turning on an ignition by a driver of a fuel cell vehicle. At this time of the start-up, the controller 10 performs a first hydrogen leakage detecting process first as the hydrogen leakage detecting process. In response to a result of determination by the first hydrogen leakage detecting process, the controller 10 performs a second hydrogen leakage detecting process.

FIG. 2 is an explanatory view showing a flow of the first hydrogen leakage detecting process. In step S10, the controller 10 detects pressure in the low-voltage zone LPZ by using the pressure measurement unit 56 before starting supply of reactive gas to the fuel cell 20. The process of step S10 corresponds to a concept subordinate to a pressure detecting step of this invention. In step S20, the controller 10 determines whether there is probability of the occurrence of hydrogen leakage using the detected pressure value obtained in step S10. Step S20 corresponds to a concept subordinate to a determining step of this invention.

FIG. 3 is an explanatory view for explaining the determining process in step S20 in the first hydrogen leakage detecting process. In step S20, the controller 10 of this embodiment determines whether a detected pressure value Pm is equal to or higher than predetermined threshold pressure Pta (hereinafter also called "first threshold pressure Pta"). Specifically, the controller 10 determines whether the relationship of Pm≥Pta is satisfied. In this embodiment, the first threshold pressure Pta is set to be lower than pressure Pe in the low-pressure zone LPZ at a time of end of operation of the fuel cell system 100 and to be higher than atmospheric pressure AP.

In this embodiment, the controller 10 closes the valves in the cathode gas supply and discharge unit 30 and the anode gas supply and discharge circulation unit 50 to pressurize the low-pressure zone LPZ to predetermined pressure (180 kPa or more, for example) and finishes operation of the fuel cell system 100 in the state that the low-pressure zone LPZ is sealed in this pressure. In the below, the pressure Pe in the low-pressure zone LPZ at a time of end of operation of the fuel cell system 100 is also called "operation-end pressure Pe." If pressure in the low-pressure zone LPZ is lower than the operation-end pressure Pe, the controller 10 may drive the hydrogen supply device 55 to pressurize the low-pressure zone LPZ to the operation-end pressure Pe and then finish operation of the fuel cell system 100.

On the occurrence of hydrogen leakage from the circulation path for hydrogen including the low-pressure zone LPZ, if the fuel cell system 100 stops operation even for a short time (a few minutes or less, for example), pressure in the low-pressure zone LPZ drops to a value near the atmospheric pressure AP or same as or below the atmospheric pressure AP. In this embodiment, the first threshold pressure Pta is obtained by adding α (0<α<10) kPa to the atmospheric pressure AP (as in the following formula A).

$$Pta = AP + \alpha \tag{A}$$

The value α may be determined experimentally in advance to be about 6 kPa, for example.

In step S20 shown in FIG. 2, if the detected pressure value Pm is determined to be equal to or higher than the first threshold pressure Pta, specifically, if Pm≥Pta, the controller 10 determines that there is no probability of hydrogen leakage from the circulation path for hydrogen including the low-pressure zone LPZ of the fuel cell system 100. Then, the controller 10 finishes the first hydrogen leakage detecting process. In this case, the controller 10 starts a start-up process for starting generating power in the fuel cell 20, and starts operation control of the fuel cell 20. The first threshold pressure Pta of this embodiment corresponds to a concept subordinate to a first pressure value of this invention and the condition for the determination in step S20 corresponds to a concept subordinate to a first condition of this invention. If the detected pressure value Pm is lower than the first threshold pressure Pta, specifically, if Pm<Pta, the controller 10 determines that there is probability of the occurrence of hydrogen leakage. Then, the controller 10 starts the second hydrogen leakage detecting process in step S30.

FIG. 4 is an explanatory view showing a flow of the second hydrogen leakage detecting process. A series of steps in the second hydrogen leakage detecting process described below corresponds to a concept subordinate to a pressurizing leakage detecting step of this invention. In step S50, the controller 10 performs a pressurizing process of increasing pressure in the low-pressure zone LPZ. More specifically, the controller 10 opens the main stop valve 53, places the regulator 54 at a given degree of opening, and drives the hydrogen supply device 55. In step S50, the pressure in the low-pressure zone LPZ is increased to 180 kPa or more, for example.

In step S60, the controller 10 stops drive of the hydrogen supply device 55 and stands by for a predetermined period of time (about a few seconds, for example) while keeping the drain valve 66 in a closed position. In step S70, the controller 10 detects pressure in the low-voltage zone LPZ by using the pressure measurement unit 56. In step S80, the controller 10 determines whether the detected pressure value Pm in the low-pressure zone LPZ obtained in step S70 is equal to or higher than a predetermined threshold pressure Ptb (also called "second threshold pressure Ptb"). The second threshold pressure Ptb is set to be about 100 kPa, for example. However, the second threshold pressure Ptb may be another value that is determined experimentally in advance so that hydrogen leakage is detected.

In step S80, if the detected pressure value Pm is determined to be equal to or higher than the second threshold pressure Ptb, specifically, if Pm≥Ptb, the controller 10 determines that there is no probability of hydrogen leakage from the circulation path for hydrogen including the low-pressure zone LPZ. Then, the controller 10 finishes the second hydrogen leakage detecting process. In this case, the controller 10 starts the start-up process of making the fuel cell 20 start generating power, thereby starting operation of the fuel cell 20.

If the detected pressure value Pm is lower than the second threshold pressure Ptb, specifically, if Pm<Ptb, the controller 10 determines that there is probability of the occurrence of hydrogen leakage. Then, the controller 10 starts a process of handling the hydrogen leakage in step S90. More specifically, the controller 10 stops the main stop valve 53 and performs a notifying process of notifying a driver of a fuel cell vehicle of probability of the occurrence of the hydrogen leakage. The notifying process includes lighting an indicator or generating a warning sound, for example.

A3. Conclusion of First Embodiment

In the fuel cell system 100 in the first embodiment, by performing the first hydrogen leakage detecting process of detecting pressure in the circulation path for hydrogen including the low-pressure zone LPZ before supply of reactive gas, probability of the occurrence of hydrogen leakage is determined easily and promptly. This shortens a processing time required for detecting the occurrence of hydrogen leakage. If it is determined that there is probability of the occurrence of hydrogen leakage as a result of the first hydrogen leakage detecting process, the second hydrogen leakage detecting process is performed. Performing these processes of making a double check detects the occurrence of hydrogen leakage more reliably. As a result, the occurrence of hydrogen leakage can be detected more reliably before the fuel cell system 100 is started.

B. Second Embodiment

Figure 5:
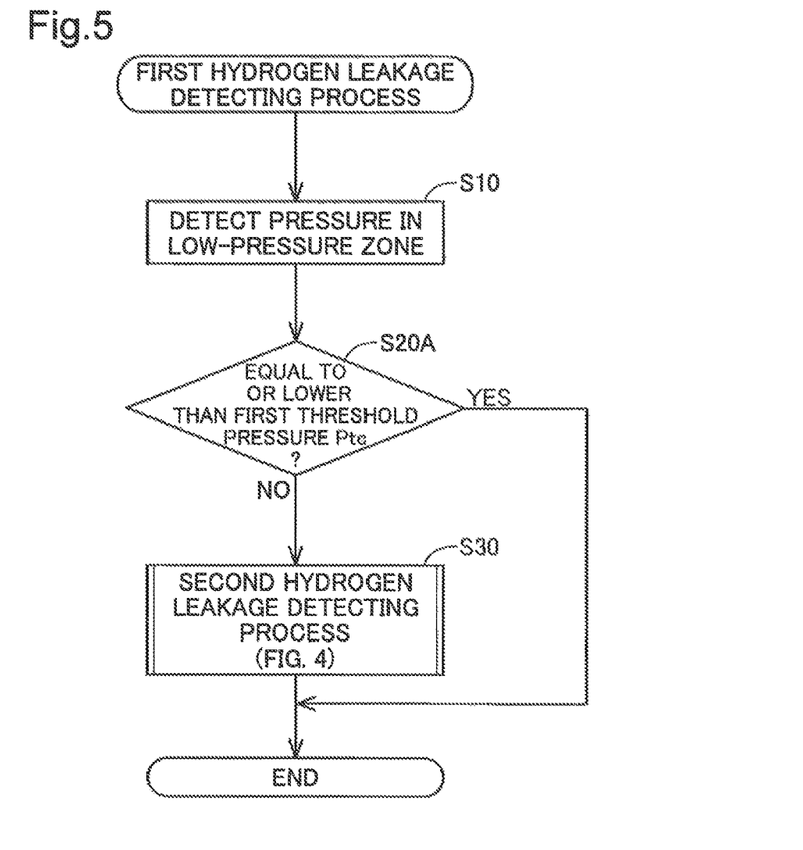
FIG. 5 is an explanatory view showing a flow of a first hydrogen leakage detecting process in a second embodiment.
Figure 6:
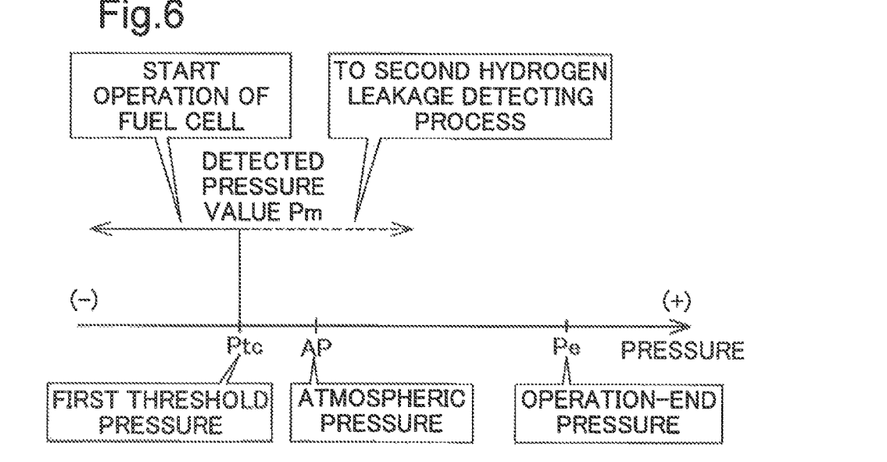
FIG. 6 is an explanatory view for explaining a determining process in the first hydrogen leakage detecting process in the second embodiment.

With referring to FIGS. 5 and 6, describe a hydrogen leakage detecting process in a second embodiment. The hydrogen leakage detecting process of the second embodiment is performed in a fuel cell system 100 which has a structure substantially the same as that described in the first embodiment shown in FIG. 1. Similar to the first embodiment, the controller 10 in the second embodiment performs a first hydrogen leakage detecting process first as the hydrogen leakage detecting process at a time of start-up of the fuel cell system 100. In accordance with a result of determination in the first hydrogen leakage detecting process, the controller 10 performs a second hydrogen leakage detecting process. Except for a condition for determination, the first hydrogen leakage detecting process in the second embodiment is substantially the same as that of the first embodiment, as described below. The second hydrogen leakage detecting process of the second embodiment is the same as that of the first embodiment shown in FIG. 4, so that it will not be described repeatedly.

FIG. 5 is an explanatory view showing a flow of the first hydrogen leakage detecting process in the second embodiment. The first hydrogen leakage detecting process in the second embodiment is the same as that of the first embodiment, except for a condition for determination in a determining process of step S20A. FIG. 6 is an explanatory view for explaining the determining process in step S20A in the first hydrogen leakage detecting process.

In the first hydrogen leakage detecting process in the second embodiment, the controller 10 determines whether the detected pressure value Pm obtained in step S10 is equal to or lower than predetermined first threshold pressure Ptc. Specifically, the controller 10 determines whether a relationship of Pm≤Ptc is satisfied. In the second embodiment, the first threshold pressure Ptc used as a condition for the determination in step S20A is obtained by subtracting β (0<β<10) kPa from the atmospheric pressure AP as in the following formula B.

$$Ptc = AP - \beta \quad (B)$$

The value β may be determined experimentally in advance to be about 6 kPa, for example.

If the fuel cell 20 is left uncontrolled for a long time (a few hours or more, for example) in a state where operation of the fuel cell system 100 is stopped and a path for reactive gas is sealed, the pressure of the anode of the fuel cell 20 is quite likely to drop to a level of negative pressure. This pressure drop is caused by drop of water vapor partial pressure resulting from temperature drop of the fuel cell 20 or by consumption of hydrogen and oxygen remaining in the fuel cell 20 resulting from reaction therebetween, for example. The presence of a leakage path for hydrogen in the circulation path for hydrogen including the low-pressure zone LPZ permits entry of external air through this leakage path. Thus, the pressure of the anode of the fuel cell 20 and pressure in the circulation path for hydrogen including the low-pressure zone LPZ are quite likely to become equal to the atmospheric pressure AP or negative pressure near the atmospheric pressure AP.

If the detected pressure value Pm in the low-pressure zone LPZ is equal to or lower than the first threshold pressure Ptc, the controller 10 determines that there is no entry of external air into the anode of the fuel cell 20 and into the low-pressure zone LPZ so there is no probability of the occurrence of hydrogen leakage. In this case, the controller 10 starts a start-up process for starting generating power in the fuel cell 20. The first threshold pressure Ptc of the second embodiment corresponds to a concept subordinate to a second pressure value of this invention and the condition for the determination in step S20A corresponds to a concept subordinate to a second condition of this invention. If the detected pressure value Pm is higher than the first threshold pressure Ptc, specifically, if Pm>Ptc, the controller 10 determines that there is probability of entry of external air resulting from the presence of the leakage path for hydrogen. Then, the controller 10 starts the second hydrogen leakage detecting process.

As described above, in the hydrogen leakage detecting process in the second embodiment, the condition for the determination used in the hydrogen leakage detecting process reflects temperature drop or consumption of remaining reactive gas to be caused after the fuel cell 20 stops generating power. Thus, probability of the occurrence of hydrogen leakage is detected promptly. Further, the fuel cell system 100 and the hydrogen leakage detecting process in the second embodiment achieve working effect comparable to that described in relation to the fuel cell system 100 of the first embodiment.

C. Third Embodiment

Figure 7:
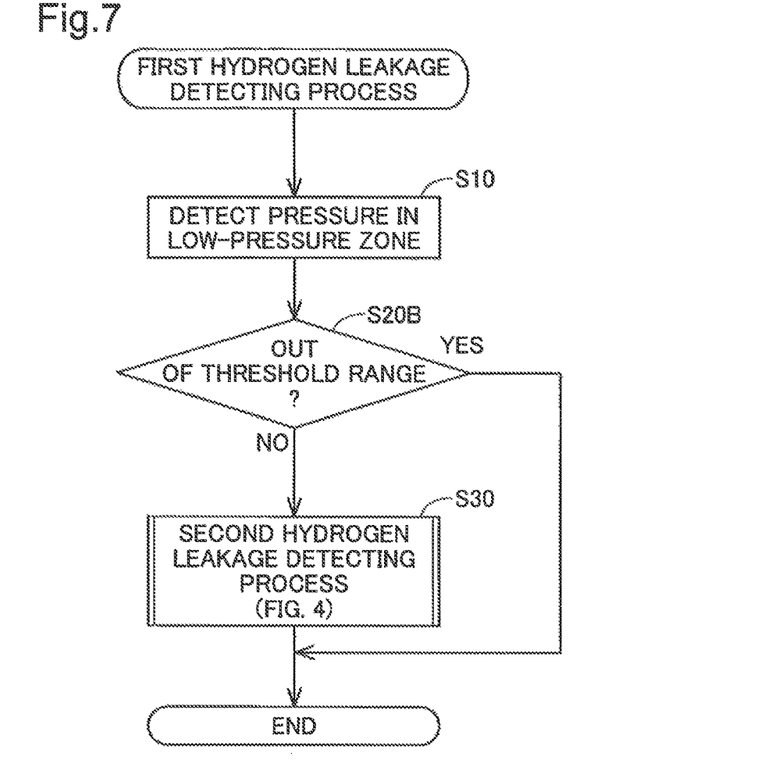
FIG. 7 is an explanatory view showing a flow of a first hydrogen leakage detecting process in a third embodiment.
Figure 8:
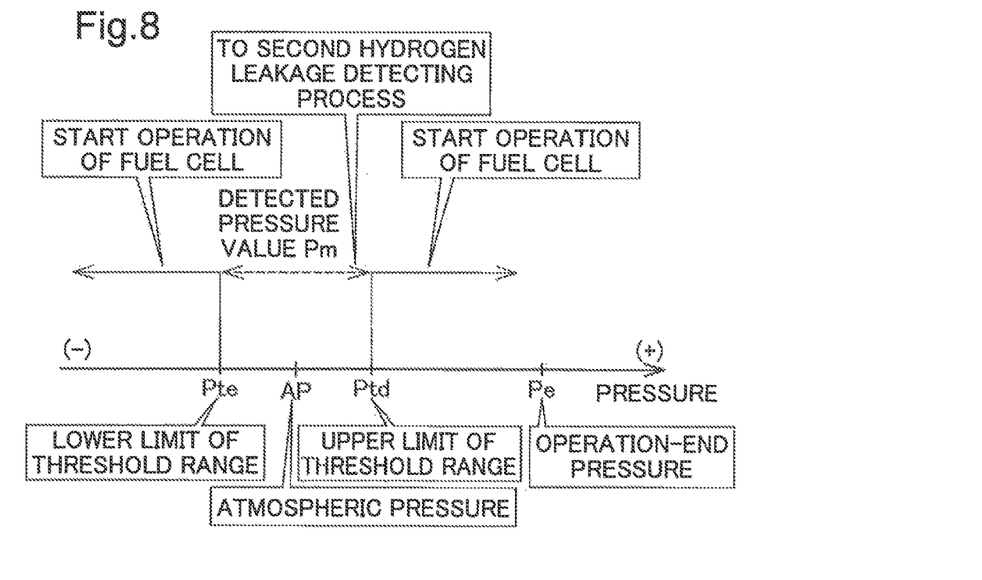
FIG. 8 is an explanatory view for explaining a determining process in the first hydrogen leakage detecting process in the third embodiment.

With referring to FIGS. 7 and 8, describe a hydrogen leakage detecting process in a third embodiment. The hydrogen leakage detecting process in the third embodiment is performed in a fuel cell system 100 which has a structure substantially the same as that descried in the first embodiment shown in FIG. 1. Similar to the first embodiment, the controller 10 in the third embodiment performs a first hydrogen leakage detecting process first as the hydrogen leakage detecting process at a time of start-up of the fuel cell system 100. In accordance with a result of determination by the first hydrogen leakage detecting process, the controller 10 performs a second hydrogen leakage detecting process. Except for a condition for determination, the first hydrogen leakage detecting process in the third embodiment is substantially the same as that in the first embodiment, as described below. The second hydrogen leakage detecting process in the third embodiment is the same as that of the first embodiment shown in FIG. 4, so that it will not be described repeatedly.

FIG. 7 is an explanatory view showing a flow of the first hydrogen leakage detecting process in the third embodiment. The first hydrogen leakage detecting process in the third embodiment is the same as that in the first embodiment, except for a condition for determination in a determining process in step S20B. FIG. 8 is an explanatory view for explaining the determining process in step S20B in the first hydrogen leakage detecting process.

In the first hydrogen leakage detecting process in the third embodiment, the controller 10 determines whether the detected pressure value Pm obtained in step S10 is out of a predetermined threshold range in step S20B. Like the first threshold pressure Pta in the first embodiment, an upper limit Ptd of the threshold range used as a condition for the determination in step S20B is determined to be lower than the operation-end pressure Pe and to be higher than the atmospheric pressure AP as in the following formula C.

$$Ptd=AP+\alpha, \ 0<\alpha<10 \text{ kPa} \tag{C}$$

Like the first threshold pressure Ptc of the second embodiment, a lower limit Pte of the threshold range is determined to be lower than the atmospheric pressure AP (as in the following formula D).

$$Pte=AP-\beta, \ 0<\beta<10 \text{ kPa} \tag{D}$$

The values α and β may be determined experimentally both to be about 6 kPa, for example. The values α and β may be different.

If the detected pressure value Pm in the low-pressure zone LPZ obtained in step S10 is equal to or higher than the upper limit Ptd of the threshold range, it is determined that pressure drop resulting from hydrogen leakage does not occur, as described in the first embodiment. If the detected pressure value Pm is equal to or lower than the lower limit Pte of the threshold range, it is determined that there is no entry of external air into the circulation path for hydrogen including the low-pressure zone LPZ so the pressure of hydrogen in the low-pressure zone LPZ is placed in an expected negative state, as described in the second embodiment.

If the detected pressure value Pm is equal to or higher than the upper limit Ptd of the threshold range, specifically, if Pm≥Ptd, or if the detected pressure value Pm is equal to or lower than the lower limit Pte of the threshold range, specifically, if Pm≤Pte, the controller 10 determines that there is no probability of the occurrence of hydrogen leakage as shown Yes arrow of step S20B. In this case, the controller 10 starts a start-up process for starting generating power in the fuel cell 20 without performing the second hydrogen leakage detecting process. If the detected pressure value Pm is lower than the upper limit Ptd and higher than the lower limit Pte of the threshold range, specifically, if Pte<Pm<Ptd, the controller 10 determines that there is probability of the occurrence of hydrogen leakage as shown NO arrow of step S20B. In this case, the controller 10 proceeds to the second hydrogen leakage detecting process.

If only a short time (about a few minutes, for example) has elapsed from end of operation to restart of the fuel cell system 100, the condition for determination used in the first hydrogen leakage detecting process in the first embodiment achieves a higher degree of determination accuracy. If a long time (about a few hours, for example) has elapsed from end of operation of the fuel cell system 100, the condition for determination used in the first hydrogen leakage detecting process in the second embodiment achieves a higher degree of determination accuracy. The first hydrogen leakage detecting process in the third embodiment uses these conditions for determination in combination. This makes it possible to achieve a high degree of determination accuracy irrespective of a length of time when the fuel cell system 100 stops operation.

As described above, the hydrogen leakage detecting process in the third embodiment uses the condition for determination described in the first embodiment and the condition for determination described in the second embodiment in combination. This makes it possible to detect hydrogen leakage in the low-pressure zone LPZ more accurately. Further, the fuel cell system 100 and the hydrogen leakage detecting process in the third embodiment achieve working effects comparable to those described in the first and second embodiments.

D. Modifications

D1. First Modification

In each of the aforementioned embodiments, if it is determined that there is probability of the occurrence of hydrogen leakage as a result of the first hydrogen leakage detecting process, as shown by No arrow of steps S20, S20A, and S20B, the second hydrogen leakage detecting process is performed. Alternatively, the second hydrogen leakage detecting process may be omitted. In this case, the controller 10 may perform a notifying process of notifying a driver of probability of hydrogen leakage or a process of canceling start-up of the fuel cell system 100 without performing the second hydrogen leakage detecting process. Conversely, the second hydrogen leakage detecting process may still be performed even if it is determined that there is no probability of the occurrence of hydrogen leakage as a result of the first hydrogen leakage detecting process.

D2. Second Modification

In the second hydrogen leakage detecting process of each of the aforementioned embodiments, the controller 10 detects the occurrence of hydrogen leakage in the low-pressure zone LPZ by detecting pressure drop after pressurizing the low-pressure zone LPZ. Alternatively, the controller 10 may detect the occurrence of hydrogen leakage in the low-pressure zone LPZ based on how pressure increase in the low-pressure zone LPZ changes during the pressurization. More specifically, the controller 10 may determine that hydrogen leakage occurs in the low-pressure zone LPZ if pressure in the low-pressure zone LPZ increases at a rate same as or lower than a given threshold during the pressurization. Alternatively, the controller 10 may measure a time elapsed before pressure in the low-pressure zone LPZ drops to a given lower limit after the low-pressure zone LPZ is pressurized and detect the occurrence of hydrogen leakage based on the measured time.

D3. Third Modification

In each of the aforementioned embodiments, the fuel cell system 100 is installed on a fuel cell vehicle. Alternatively, the fuel cell system 100 may be installed on a mobile object other than a fuel cell vehicle. Still alternatively, the fuel cell system 100 may be fixedly arranged in a building or on ground without being installed on a mobile object.

This invention is not limited to the aforementioned embodiments, examples, or modifications but can be implemented in various structures within a range that does not deviate from the substance of this invention. As an example, technical features in the embodiments, examples, or modifications corresponding to those in each of the aspects described in Summary of Invention can be replaced or combined, where appropriate, with the intention of solving some or all of the aforementioned problems or achieving some or all of the aforementioned effects. Unless being described as absolute necessities in this specification, these technical features may be deleted, where appropriate. In each of the aforementioned embodiments and modifications, some or all of the functions and some or all of the processes achieved by software may alternatively be achieved by hardware. Likewise, some or all of the functions and some or all of the processes achieved by hardware may alternatively be achieved by software. Various circuits are applicable as this hardware including an integrated circuit, a discrete circuit, and a circuit module using these circuits in combination.

What is claimed is:

1. A method of detecting leakage of reactive gas to be supplied to a fuel cell at a time of start-up of the fuel cell, comprising:

a pressure detecting step of detecting pressure in a supply piping before the pressure in the supply piping is increased by supplying the reactive gas to the fuel cell through the supply piping; and a determining step of determining the presence or absence of leakage of the reactive gas without pressurizing inside the supply piping by using a measured pressure value obtained in the pressure detecting step, wherein the determining step uses at least one of a first condition and a second condition for determination as a determination condition, and determines that there is no leakage of the reactive gas while the fuel cell stops generating power if the determination condition is satisfied, the first condition is that the measured pressure value is equal to or higher than a first pressure value that is lower than pressure in the supply piping at a time of end of operation of the fuel cell and higher than atmospheric pressure, the second condition is that the measured pressure value is equal to or lower than a second pressure value that is lower than the atmospheric pressure.

2. The method in accordance with claim 1 further comprising:

a pressurizing leakage detecting step of supplying the reactive gas to the supply piping to pressurize the supply piping and detecting a leakage of the reactive gas based on pressure change in the supply piping after the supply piping is pressurized, wherein the pressurizing leakage detecting step is performed, if it is not determined that there is no leakage of the reactive gas in the determining step.

3. The method in accordance with claim 2, wherein the determining step uses both the first and second conditions, and the pressurizing leakage detecting step is performed if the measured pressure value is lower than the first pressure value and higher than the second pressure value.

4. A fuel cell system comprising:

a fuel cell;

a reactive gas supply unit that includes a supply piping connected to the fuel cell, and supplies a reactive gas to the fuel cell through the supply piping;

a pressure detector that detects pressure in the supply piping; and a controller that controls operation of the fuel cell by controlling supply of the reactive gas to the fuel cell, wherein the controller obtains a detected value of pressure in the supply piping based on the detected result by the pressure detector before the pressure in the supply piping is increased by supplying the reactive gas to the fuel cell to start generating power in the fuel cell, the controller determines the leakage of the reactive gas without pressurizing inside the supply piping by using the detected value of pressure in the supply piping and a predetermined condition, the controller determines that the leakage of the reactive gas is absent and starts a process for starting generating power in the fuel cell if the detected value satisfies a predetermined condition, the controller determines that the leakage of the reactive gas is present and starts a process of detecting leakage of the reactive gas if the detected value does not satisfy the predetermined condition, the controller uses at least one of a first condition and a second condition as the predetermined condition, the first condition is satisfied if the detected value is equal to or higher than a first pressure value that is lower than pressure in the supply piping at a time of end of operation of the fuel cell and higher than atmospheric pressure, and the second condition is satisfied if the detected value is equal to or lower than a second pressure value that is lower than the atmospheric pressure.

5. The fuel cell system in accordance with claim 4, wherein the process of detecting leakage of the reactive gas is a process of supplying the reactive gas to the supply piping in order to pressurize the supply piping and detecting leakage of the reactive gas based on pressure change in the supply piping after the supply piping is pressurized.

6. The fuel cell system in accordance with claim 4, wherein the controller uses both the first and second conditions as the predetermined condition, if one of the first and second conditions is satisfied, the controller starts the process of making the fuel cell start generating power, and if both the first and second conditions are not satisfied, the controller starts the process of detecting leakage of the reactive gas.

* * * * *